April 16, 1968 TAKASHI YAMASHIKI 3,378,339
METHOD OF REMOVING THE ACCOMPANYING LIQUID OF A CONTINUOUSLY
TRANSFERRED ION EXCHANGE RESIN
Filed July 5, 1962 5 Sheets-Sheet 1

United States Patent Office 3,378,339
Patented Apr. 16, 1968

3,378,339
METHOD OF REMOVING THE ACCOMPANYING LIQUID OF A CONTINUOUSLY TRANSFERRED ION EXCHANGE RESIN
Takashi Yamashiki, Yokohama, Japan, assignor to Asahi Kasei Kogyo Kabushiki Kaisha, Osaka, Japan, a corporation of Japan
Filed July 5, 1962, Ser. No. 207,556
Claims priority, application Japan, Sept. 7, 1961, 36/31,921, 36/31,922, 36/31,923, 36/31,924
6 Claims. (Cl. 23—100)

This invention relates to an apparatus and a method for separating and removing the accompanying liquid of a continuously transferred ion exchange resin, as used in the continuous ion exchange process of the movable bed type.

In the treatment of a concentrated solution by use of an apparatus in which ion exchange resin is transferred continuously, a great volume of resin is circulated.

This makes it necessary to separate and remove the accompanying liquid for regenerating the said resin and to prevent the said resin from being diluted by the said accompanying liquid.

Generally, when ion exchange resin is transferred under pressure in a liquid-containing slurry form, about 0.3 m.$^3$ of water out of any 1.3 m.$^3$ of the slurry in its most closely packed state becomes supernatant, and the further 1 m.$^3$ of the resin contains 0.5 m.$^3$ of water in its voids (i.e. the void percentage is 50%).

Up to the present, various mechanical methods have been developed for separating water from such slurry.

When these conventional methods are applied to the resin, the above 0.3 m.$^3$ of the supernatant liquid can easily be removed but it is very difficult to remove the 0.5 m.$^3$ of void water. If a more vigorous separation method is applied, the resin will be damaged and, because of the dehydration of the resin, a special apparatus will be necessary for smoothly transferring the dry resin. The above requirements may interfere with the continuous transfer of the resin. Therefore, such mechanical methods are considered impracticable. The inventor herein has conducted an extensive study with a view to solving these problems and has succeeded in finding a perfect solution by use of the apparatus as will be described in the following with reference to the accompanying drawings.

Figures 1, 2:
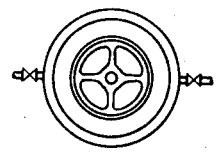
Figures 1, 2, 3:
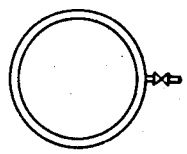
Figures 1, 2, 3, 4:
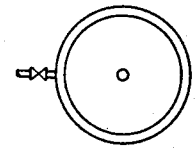
Figure 1:
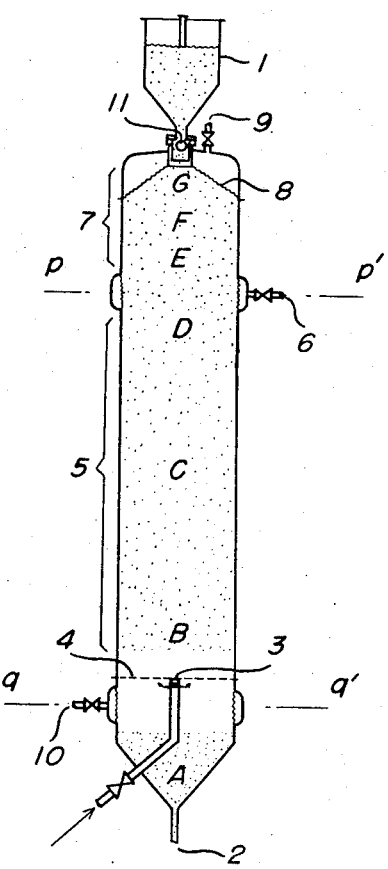
Figures 1, 2:
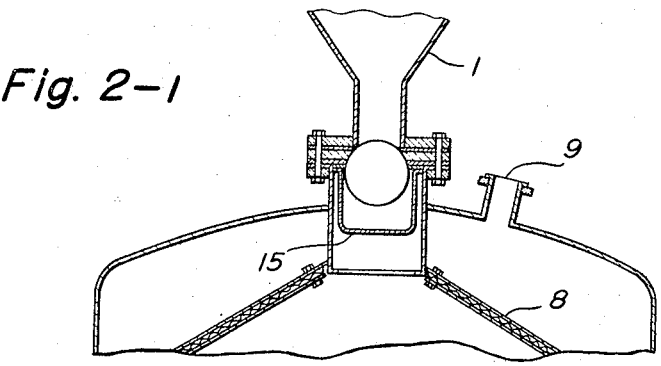
Figure 2:
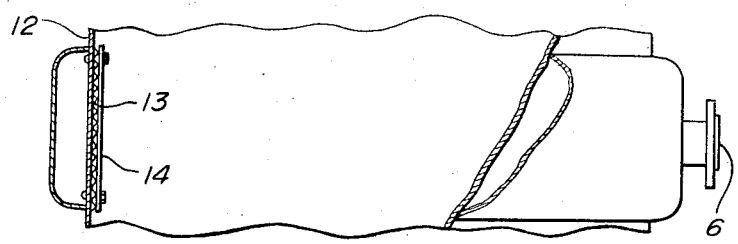
Figures 2, 3:
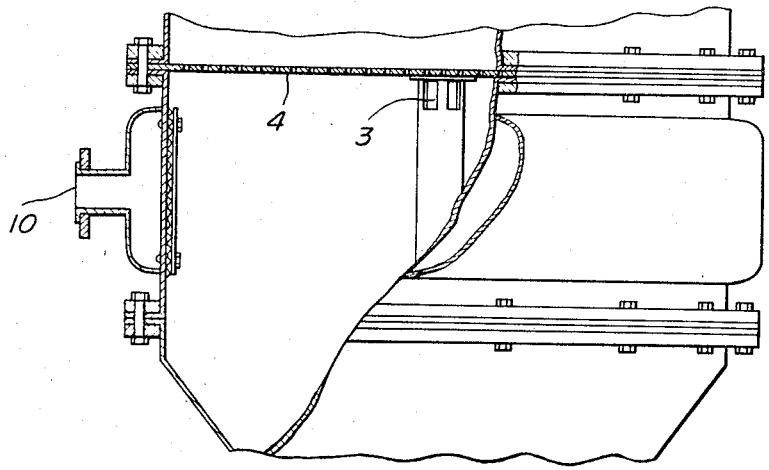
Figure 3:
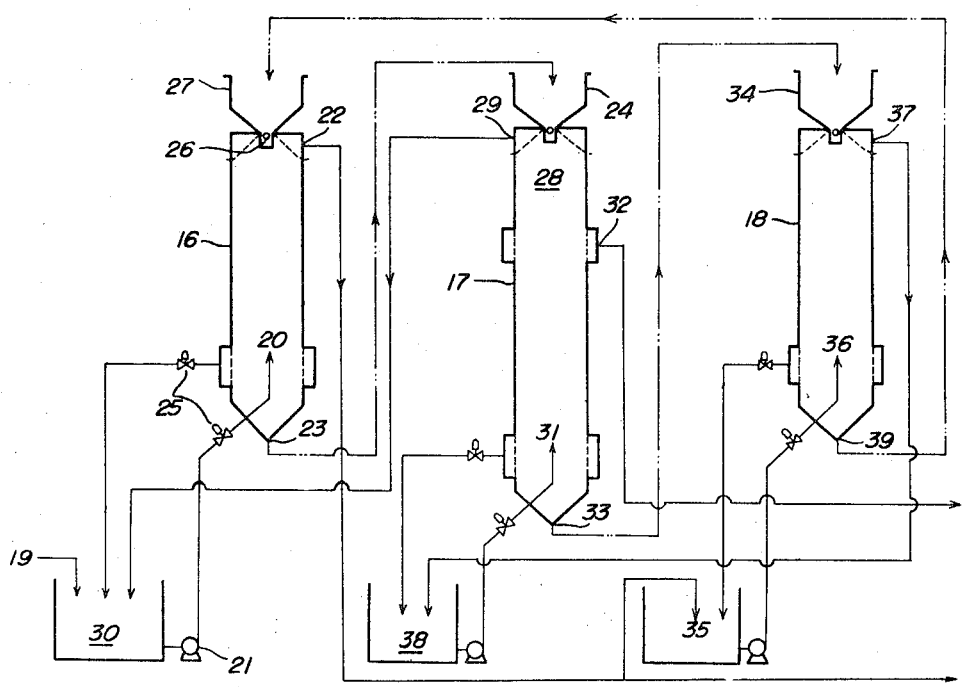
Figure 4:
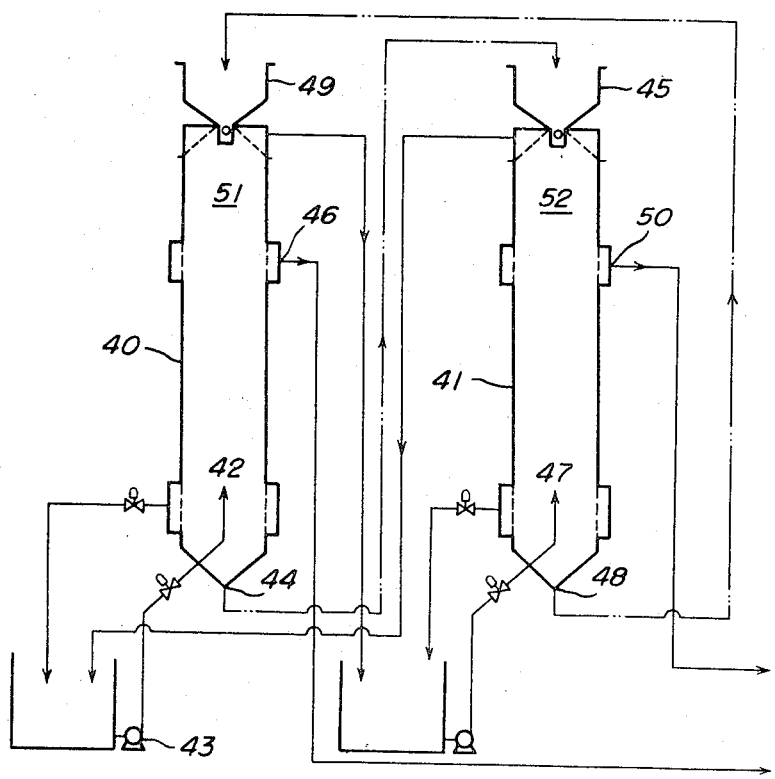
Figure 5:
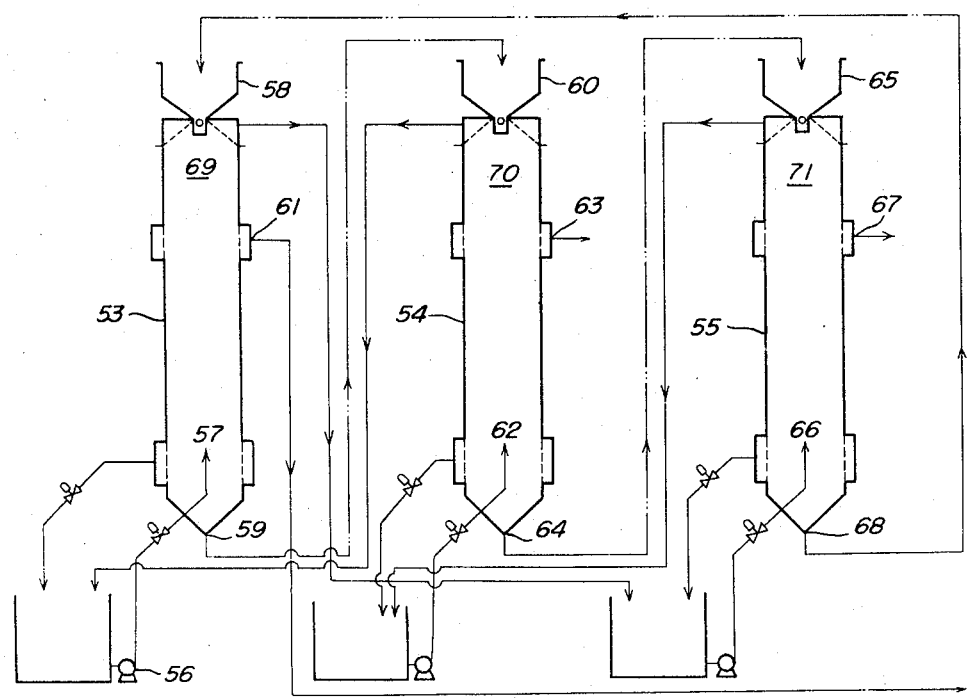

In the accompanying drawings illustrative of an apparatus embodying one form of this invention, FIG. 1—1 represents a sectional elevation of one unit thereof, FIG. 1—2 represents a plan view of FIG. 1—1, FIG. 1—3 represents a section on line P–P' of FIG. 1—1, and FIG. 1—4 represents a section on $q$–$q'$ of FIG. 1—1. FIGS. 2—1, 2—2, and 2—3 represent enlarged sectional views of important parts of the apparatus. FIG. 3 is a process flow-sheet showing one application of this apparatus in the separation of sulfuric acid and copper sulfate from solutions containing the same, FIG. 4 is a process flow-sheet showing one application of this apparatus in the manufacture of ammonium chloride, and FIG. 5 is a process flow-sheet showing one application of this apparatus in the refinement of saline water.

In FIG. 1, the resin that has completed ion exchange in a preceding stage is transferred with its accompanying liquid into a hopper 1. After the resin that entered the column from the hopper has completed ion exchange, it is advanced under pressure to the next stage through a resin outlet 2.

In the column, the states of the resin are as follows. In (A), there exists the resin which has already completed ion exchange. This resin is gradually transferred to the next stage under the pressure exerted by the passing liquid. In the part of an inlet 3 through which a raw solution is supplied for treatment, the pressure exerted by the counter-flow of the raw solution pushes the resin upward in the vessel. 4 is a perforated plate or distributor.

Above (B), the resin thus pushed upward from below by the counter-flow pressure of passing raw solution is filled in layers. (B) represents a layer of the resin in the state of complete adsorption equilibrium, (C) denoting another layer of the resin in the process of ion exchange. (D) indicates a layer wherein adsorption is not yet completed. Ion exchange actually takes place between layers (B)–(D), i.e. in section 5. After completing the ion exchange reaction, the treated solution is discharged through an outlet 6. This outlet has a structure such as illustrated in FIGURE 2—2, in which the column wall 12 is provided with a plurality of small holes, and a wire net 13, its lower and upper ends being welded to the said column wall, is tightly fixed to the column wall by a perforated plate 14.

Section 7 operates to effect the removal of the liquid accompanying the resin. At this section, as the result of liquid withdrawal and solution passage, the resin and its accompanying liquid move slightly up and down at the part where the accompanying liquid is removed. In doing so, only the resin gradually descends, while the accompanying liquid merely undergoes a vertical movement within the same height zone.

In other words, by maintaining the volume of the raw solution fed through 3 equal with that of the treated solution discharged through 6, the accompanying liquid in 7 is allowed to move only in the same region at an average velocity of virtually zero. Thus, the accompanying liquid entering from the hopper is separated and removed from an outlet 9 via a filter 8 in an amount equal to the amount fed in the column from the hopper.

If the amount of the already treated and discharged solution is not equal to that of charged solution to be treated, mixture occurs between the accompanying liquid and the solution charged for treatment, if the amount of discharged solution is larger, the accompanying liquid is mixed into the solution, and if it is smaller, the solution mixes into the accompanying liquid. For perfect separation of the accompanying liquid, therefore, it is vital for this process to maintain the amount of already treated and discharged solution equal to that of charged solution to be treated.

Generally, when a fixed bed type ion exchange process is employed, the resin is fixed and only the liquid is transferred; whereas in the continuous ion exchange process, the resin and the liquid are alternately transferred in counter flow.

According to this invention, the solution is fixed in position and only the resin is transferred in order to be freed from its accompanying liquid. That is to say, in layer (G) the resin is accompanied by the liquid, but in layer (F) where the accompanying liquid is replaced, only the resin is transferred, while the accompanying liquid merely makes a vertical movement in the same height zone. This results in gradual replacement of the accompanying liquid. In (E), the above accompanying liquid is completely removed from the resin, which is now accompanied by a new liquid, i.e., the treated solution.

In the removal of the accompanying liquid in the apparatus of this invention, it is essential for the resin to be transferred continuously without breakage of its layers.

That is to say, by feeding the raw solution through 3 for a fixed period of time, the resin in a cone-shaped bottom (A) of the column is subjected to the pressure of the solution introduced at 3 and is gradually discharged under this pressure together with some raw solution through the resin outlet 2, while the ion exchange zone (c) ascends gradually at the same time.

Now, the magnetic valves provided in the feeding and discharging pipes are operated to stop the feeding and start the discharging at the same time, the liquid in the free zone is drawn out through 10 and the resin layers descend again. The structure of this draw-out section is illustrated in FIGURE 2–3, which is exactly the same as that of the treated liquid outlet 6 illustrated in FIGURE 2—2. As the resin is transferred downward, a check valve 11, such as a ball valve or butterfly valve, provided in the connecting part between the hopper and the column, opens in consequence of a lowered pressure in the column, and the resin in the hopper flows into the column.

FIGURE 2—1 illustrates the cross-section of the ball valve, while 15 represents a basket.

Repetition of the above operation makes possible the continuous transfer of the resin, and the ion exchange resin will form successive layers in the column.

Further, the distributor 4, as indicated in FIGURE 1—1, is provided in the inlet of the raw solution in order to rectify its feeding flow and make uniform the liquid flow within the column.

In this case, the solution is distributed in the directions indicated by the arrows, providing liquid pressure uniformly and pushing up the resin without breaking the ion exchange layers. Therefore, the apparatus provided with the distributor is more effective than one without it.

The apparatus of this invention as explained above makes perfectly possible the hitherto extremely difficult separation and removal for reuse of the accompanying liquid from the continuously transferred resin.

Futhermore, since the resin is not dehydrated in the removal of its accompanying liquid under the present invention, the resin can be continuously transferred without any hindrance whatsoever. The abovementioned superior characteristics are achieved merely by slightly increasing the height of the column without necessitating any special separating apparatus. As explained above, novel utilization can be achieved by various combinations of the apparatus of this invention and the conventional apparatus for the continuous ion exchange of movable bed type.

First, in a series of apparatuses consisting of solution-passing, first regeneration and second regeneration columns, the resin is circulated as follows; the resin having completed ion exchange is discharged from the lower part of the solution-passing column and is fed into the upper part of the first regeneration column, as fresh resin from the lower part of the first regeneration column is passed to the upper part of the second regeneration column, and then the fresh resin discharged from the lower part of the second regeneration column is supplied again to the upper part of the solution-passing column. The ion exchange of the solution to be treated is performed in the first solution-passing column, wherein any ions, except ones contained in the ion exchange resin, are completely adsorbed and removed. This treated solution is stored as a final product, but apart of it is fed into the second regeneration column to change the type of resin. Moreover, after it changes the type of resin in the second regeneration column, it is also changed to a solution containing a different ion released from the resin and is fed into the first regeneration column.

In this case, the solution discharged from the upper part of the solution-passing column or the second regeneration column, that is, the treated solution is quite the same with the accompanying liquid of the resin charged from the hopper of the corresponding column, respectively so no troubles take place in the reactions. Therefore, the conventional apparatus for the continuous ion exchange of movable bed type can be used for the solution-passing column and the second regeneration column, but not for the first regeneration column, because the accompanying liquid of the resin is different from the said solution and is required not to be mixed with it.

Thus, an appaartus for the continuous ion exchange of movable bed type equipped with an apparatus for removing the accompanying liquid of the resin is effectively used for the first regeneration appaartus.

This apparatus can prevent the treated solution from being mixed with the accompanying liquid. The separated accompanying liquid is returned to the solution-passing column and the treated solution of the first regeneration column can be recovered through the middle part of the column (see Example 3).

Next, in the case of an apparatus consisting of the combination of the solution-passing column and the regeneration column, the treated solutions should not be mixed with the accompanying liquid of the resin in both the columns respectively, an apparatus for the continuous ion exchange of movable bed type equipped with an apparatus for removing the accompanying liquid of the resin is used for both the columns. The treated solutions and the accompanying liquids, after separation, are respectively returned to the corresponding storage vessels and are obtained as a final product through the outlet in the middle part of the column (see Example 4).

When, in use of an apparatus consisting of the combination of three columns, the treated solution and the accompanying liquid in each column should not be mixed with each other, an apparatus for the continuous ion exchange of movable bed type equipped with an apparatus for removing the accompanying liquid of the resin is used for all the three columns. In this case, the accompanying liquid of each column is returned to its storage vessel and the treated solution can be obtained in pure condition from the middle part of each column (see Example 5).

Several examples in which the apparatus of this invention is effectively put to use are as follows.

EXAMPLE 1

In the process wherein ammonium sulfate solution is manufactured from the waste bath acid produced in the cuprammonium rayon process, the waste bath acid accompanying the resin is recovered.

In the apparatus for manufacturing ammonium sulfate solution by counter flow reaction between $NH_4$ exchanger and waste bath acid ($H_2SO_4$ 58 g./lit. Cu 10 g./lit.), the H exchanger accompanied by the waste acid is transferred under liquid pressure through the bottom of a column into a wash column; after washing, it is then charged into a $NH_3$ adsorption column. In conventional means, the treated solution from the wash column is a dilute waste bath acid and, therefore, it is impossible to use it again as such. The reuse of the treated solution is made possible by employing the apparatus for separating the accompanying liquid.

This example will be illustrated by FIGURE 1—1, in which the part 7 indicates the part where the resin is freed from its accompanied liquid, and the part 5 denotes a layer for water washing.

The resin transferred under pressure from the preceding step is charged, at the rate of 6 m.³/hr., together with 4.8 m.³/hr. of waste bath acid, into the hopper 1 of the wash column.

Wash water is fed at the rate of 8 m.³/hr. through inlet 3. The treated water is discharged at the rate of 8 m.³/hr. through outlet 6. The waste bath acid accompanying the resin charged from the hopper is replaced and discharged, as a recovered bath acid, at the rate of 4.8 m.³/hr. through outlet 9 as the resin itself moves downward in the section 7 where the said waste bath acid is removed from the resin. Although the operation results in a certain degree of dilution and leakage into the wash water due to deviation of liquid flow, the obtained solution have the following composition.

|  | $H_2SO_4$ | Cu |
|---|---|---|
| Waste bath acid | 58 g./lit. | 10.0 g./lit. |
| Recovered bath acid | 57 g./lit. | 9.8 g./lit. |
| Waste wash water |  | ≦5 mg./lit. |
| Wash water | 0 | 0. |

EXAMPLE 2

In the process wherein ammonium sulfate solution is manufactured from the waste bath acid and waste bath water produced in the cuprammonium rayon process, a concentration decrease in the ammonium sulfate solution is prevented by removing the dilute ammonia water accompanying the resin.

When waste bath water ($NH_3$ 700 mg./lit.) is adsorbed on a weak acid H exchanger to change it to $NH_4$ exchanger, and when this resin and waste bath acid ($H_2SO_4$ 58 g./lit., Cu 10 g./lit.) are brought into counter flow reaction to produce ammonium sulfate solution, the ammonium sulfate solution thus formed is diluted because the $NH_4$ exchanger is accompanied by dilute ammonia water. In consequence thereof apparatus for removing this dilute ammonia water is used so as to prevent the ammonium sulfate solution from being diluted.

This removal of dilute ammonia water is illustrated with reference to FIGURE 1—1, wherein the $NH_4$ exchanger transferred under pressure from the preceding stage enters the hopper 1 at the rate of 9 m.³/hr., accompanied by 7.2 m.³/hr., of dilute ammonia water ($NH_3$ 700 mg./hr.).

The waste bath acid is fed through 3 at the rate of 10 m.³/hr. If the accompanying liquid is not removed, dilution by the said liquid and the swelling water occurs. As the result, the produced ammonium sulfate solution is increased in volume to 20.2 m.³/hr. and decreased in concentration to ½.

If the accompanying liquid is removed at the rate of 7.2 m.³/hr. through the outlet 9 and 10 m.³/hr. of the waste bath acid and 3 m.³/hr. of the swelling water are discharged through the outlet 6, ammonium sulfate solution having a considerably high concentration can be obtained.

The valves fixed on the accompanying liquid outlet 9 and the treated solution outlet 6 can be adjusted in opening degree to the required extent.

The solutions thus treated have the following composition:

$(NH_4)_2SO_4$ (g./100 ml.)

| | |
|---|---|
| Discharged accompanying liquid | 0.3 |
| Treated solution | 7.8 |

When the accompanying liquid is not removed, the concentration of the treated solution is 5.15 g./100 ml.

As the ammonium sulfate solution obtained is rectified into ammonia water after it is decomposed by calcium hydroxide, so the volume of vapor varies substantially with concentration of the ammonium sulfate solution.

EXAMPLE 3

The copper sulfate and sulphuric acid in the waste bath acid produced in the cuprammonium rayon process are separated and recovered. An example thereof will be illustrated by reference to FIGURE 3, in which 16 represents a solution-passing column for the untreated waste bath acid, 17 the first regeneration column and 18 the second regeneration column.

Waste bath acid 19 is charged by a feed pump 21 at the rate of 20 m.³/hr. through an inlet 20 of the column filled with 6 m.³ of resin converted to H exchanger beforehand.

The acid comes in contact and reacts with this H exchanger as it ascends the column, the $CuSO_4$ in the acid becoming $H_2SO_4$.

The treated solution from which copper has been removed, is obtained through the upper part of the column 22, as the product.

The compositions of the waste bath acid and those of the product are compared in the following table:

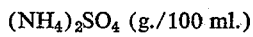

| | Waste bath acid | Product |
|---|---|---|
| $H_2SO_4$ | 58 g./lit. | 73.5 g./lit. |
| $CuSO_4$ | 25 g./lit. | Below 0.1 p.p.m. |

On the other hand, the resin adsorbs Cu and accumulates in the cone-shaped bottom of the column. Having completed the adsorption, this resin has a Cu adsorption equilibrium of 35 mg./ml. resin and is transferred, under internal solution pressure, at the rate of 6.7 m.³/hr. through a resin outlet 23 at the bottom into a hopper 24 of the first regeneration column.

After the solution has been passed for a predetermined period of time, a magnetic valve 25 is operated to stop the passage of solution and simultaneously start the discharging of solution with consequent descent of the resin.

At the same time a check valve 26, such as a ball valve or butterfly valve, opens to cause the resin in a hopper 27 of the column to flow down in to the column.

The transfer of the resin and the passage of the solution are effected in exactly the same way as the first and second regeneration columns.

The resin transferred under pressure, from the bottom of the solution-passing column is accompanied by 4.7 m.³/hr. of waste bath acid, which is removed in an accompanying liquid removing part 28 of the first regeneration column and discharged through an outlet 29 and returned to a waste bath acid storage vessel 30.

Into the first regeneration column, 80 g./lit. ammonium sulfate solution is charged at the rate of 10.4 m.³/hr. through a regenerating agent inlet 31.

The ammonium sulfate solution used here corresponds in equivalency to twice the Cu, and consists of the treated solution from the second regeneration column compensated with a certain degree of solution obtained from a different source.

The first regeneration column is of elongated cylindrical shape and is always filled with 20 m.³ of resin because its ion exchange zone is considerably long.

After completion of ion exchange, the treated $CuSO_4$ solution is obtained at the rate of 10.4 m.³/hr. through an outlet 32, and is used directly as a raw material for the spinning solution or, as occasions demand, it is separated by means of other ion exchange unit into ammonium sulfate and copper sulfate.

The treated solution has the following composition:

| | G./lit. |
|---|---|
| $CuSO_4$ | 48.1 |
| $H_2SO_4$ | 34.8 |
| $(NH_4)_2SO_4$ | 5.4 |

The resin, which has been changed almost completely to $NH_4$ exchanger, is transferred under pressure through an outlet 33 at the bottom of the column, and then charged in to a hopper 34 of the second regeneration column. The treated solution 35 from the solution-passing column is charged as the regenerating agent at the rate of 9.2 m.³/hr. through an inlet 36 at the bottom of the second regeneration column, and is caused to react with the $NH_4$ exchanger entering from the hopper to produce 84 g./lit. of aqueous solution of ammonium sulfate solution, which is then charged at the rate of 9.2 m.³/hr. through a treated solution outlet 37 into a regenerating agent storage vessel 38 of the first regeneration column.

On the other hand, $NH_4$ exchanger is regenerated into H exchanger, and transferred under pressure through a resin outlet 39 back into the said hopper 27 of the solution-passing column for recirculation.

By repeating the above operation, $H_2SO_4$ is separated and used for respective purposes. The volume of the raw material required in this operation is only 54 kg./hr., the difference between the amount of the ammonium sulfate in the treated solution of the second regeneration column and that in the solution charged into the first regeneration column, as against 798 kg./hr. of $$H_2SO_4 \ [(20-9.2) \times 73.5]$$

Therefore, this is an example representing a very economical method for recovering $H_2SO_4$. Units incorporating this apparatus can easily be applied to solutions of metallic salts other than copper sulfate.

EXAMPLE 4

Ammonium chloride is manufactured from the dilute solution of ammonium sulfate obtained in the cuprammonium rayon process [ammonium sulfate solution $(NH_4)_2SO_4$ 0.28 g./100 ml. obtained by the neutralization of waste spinning bath water and waste bath acid]. This manufacturing process will be illustrated by reference to FIGURE 4, in which 40 represents a solution-passing column for ammonium sulfate solution and 41 a column for regenerating resin with sodium chloride solution.

The ammonium sulfate solution is passed at the rate of 100 m.³/hr. by a feed pump 43 through an inlet 42 of the solution-passing column, which is filled with 4 m.³ of the resin changed to Na exchanger beforehand. Upon contact with the counter flow of the ammonium sulfate solution this resin becomes $NH_4$ exchanger.

As dilute ammonium sulfate solution contains about 300 mg./lit. of $Na_2SO_4$, the adsorption equilibrium of $NH_4$ amounts to 28 mg./ml. Na-R. The resin which has been changed to $NH_4$ exchanger is transferred under pressure at the rate of 14 m.³/hr. through a resin outlet 44 at the bottom of the column into a hopper 45 of the regeneration column. The transfer of resin, the passing and discharging of solution are carried out in exactly the same way as Example 3.

The solution passing column gives a treated solution of Glauber's salt with a concentration of about 0.33 g./100 ml., which is disposed of through a treated solution outlet 46.

The $NH_4$ exchanger charged into the column from the hopper of the regeneration column is regenerated by 6.2 m.³/hr. of 20 g./100 ml. NaCl solution, which is charged in through a regenerating agent inlet 47.

After being completely regenerated into Na exchanger, the resin is transferred under pressure through a resin outlet 48 at the bottom of the regeneration column back to a hopper 49 of the solution-passing column for recirculation.

The NaCl solution which has now changed into ammonium chloride solution through the ion exchange reaction is obtained at the rate of 6.2 m.³/hr. through a treated solution outlet 50.

The $NH_4Cl$ undergoes virtually no loss of NaCl nor dilution of $NH_4Cl$, because the liquid accompanying the resin is separated and removed in zones 51 and 52.

The composition of ammonium chloride solution obtained, and the rate of ion adsorption of the circulating resin are as follows:

| | |
|---|---|
| $NH_4Cl$ | g./100 ml__ 17.5 |
| NaCl | g./100 ml__ 0.65 |
| $(NH_4)_2SO_4$ | mg./lit__ ≦35 |

| | Resin from solution passing column | Resin from regeneration column |
|---|---|---|
| Na | 17 mg./ml. Na-R | 50 mg./ml. Na-R. |
| $NH_3$ | 25 mg./ml. Na-R | 10 mg./ml. Na-R. |

EXAMPLE 5

Exactly the same apparatus as is described in Example 4 is used to manufacture ammonium chloride from crystalline ammonium sulfate, wherein the said crystalline ammonium sulfate is first dissolved and ammonium chloride and Glauber's salt are manufactured therefrom using NaCl solution as the regenerating agent.

The transfer of the resin, and the passing and discharging of the solution are carried out in exactly the same way as in Example 3. 20 g./100 ml. ammonium sulfate solution is charged at the rate of 1 m.³/hr. through the ammonium sulfate solution inlet of the solution-passing column, which is filled with 1 m.³ of resin changed to Na exchanger beforehand. This resin comes in contact with the ammonium sulfate solution to undergo ion exchange and becomes $NH_4$ exchanger. Adsorption equilibrium of NH is 37 m.³/ml. Na-R.

The $NH_4$ exchanger is transferred under pressure at the rate of 1.47 m.³/hr. through the resin outlet at the bottom of the column into the hopper of the regeneration column. The treated solution in the solution-passing column is $Na_2SO_4$, which is obtained at the rate of 1 m.³/hr. through the treated solution outlet.

The $NH_4$ exchanger charged into the hopper of the regeneration column flows gradually down into the regeneration column, in which it comes in contact with the counter-flow of 20 g./100 ml. NaCl solution fed in at the rate of 0.89 m.³/hr. through the regenerating agent inlet at the bottom of the column. The $NH_4$ exchanger is converted to Na exchanger and is transferred through the resin outlet at the bottom of the column back into the hopper of the solution-passing column for recirculation. The treated solution is obtained as $NH_4Cl$ saturation at the rate of 0.89 m.³/hr. through the treated solution outlet. The compositions of the treated solutions obtained and the adsorption rate of the circulating resin are as follows.

| $NH_4$ solution | $Na_2SO_4$ solution |
|---|---|
| $NH_4Cl$ _____ 18.3 g./100 ml. | $Na_2SO_4$ _____ 20.5 g./100 ml. |
| NaCl _____ 500 mg./lit. | NaCl _____ 0.2 g./100 ml. |
| $(NH_4)_2SO_4$ _____ ≦30 mg./lit. | $(NH_4)_2SO_4$ _____ ≦20 mg./lit. |

| | Resin from passing column | Resin from regeneration column |
|---|---|---|
| Na | 3.2 mg./ml. Na-R | 50 mg./ml. Na-R. |
| $NH_3$ | 35.0 mg./ml. Na-R | 0.1 mg./ml. Na-R. |

EXAMPLE 6

Three of the same apparatus as is illustrated in FIG. 1—1 are used in combination to purify sea water concentrated by an ion exchange membrane. However, the transfer of the resin, and the passing and discharging of the solution in each column are carried out in exactly the same way as in Example 3. This example will be illustrated by reference to FIGURE 5, in which 53 represents the solution passing column for sea water, 54 the regeneration column using HCl and 55 the neutralization column using caustic soda.

The concentrated sea water used has the following composition.

| | N |
|---|---|
| $Na^+$ | 3.30 |
| $Mg^{++}$ | 0.65 |
| $Ca^{++}$ | 0.10 |
| $Cl^-$ | 3.95 |
| $SO_4^{--}$ | 0.10 |

So long as NaCl forms the principal constituent, any raw material will meet the purpose; i.e., the use of so-called "brine" is possible with this unit.

This concentrated sea water is fed in at the state of 8.64 m.³/hr. by a feed pump 56 through a sea water inlet 57. The solution-passing column is always filled with 3 m.³ of the weak acid cation exchange resin changed to Na exchanger, which is charged, continuously from a hopper 58. The Na exchanger comes in contact with the counterflow of sea water to become, after ion exchange, Ca and Mg exchangers, and is transferred at the rate of 2.16 m.³/hr. through a resin outlet 59 at the bottom of the column into a hopper 60 of the regenerating column. Adsorption equilibrium, in terms of Ca+Mg, is 3 mg./ml.

Na-R. On the other hand, the treated solution, from which Ca and Mg are completely removed, is obtained at the rate of 8.6 m.³/hr. through an outlet 61.

In the regeneration column, 20 g./100 ml. HCl is charged at the rate of 1.18 m.³/hr. through an inlet 62 at the bottom to regenerate the Ca+Mg exchanger fed in from the hopper at the top. As the regeneration proceeds without any consumption of excess HCl, the treated solution is obtained as a concentrated mixture of $MgCl_2$ and $CaCl_2$ (no HCl) at the rate of 1.18 m.³/hr. through an outlet 63.

The resin completely changed to H exchanger after ion exchange is transferred through a resin outlet 64 at the bottom of the regeneration column into a hopper 65 of the neutralization column.

In the neutralization column, 20 g./100 ml. NaOH which is charged at the rate of 1.30 m.³/hr. through an inlet 66 reacts with the H exchanger fed in from the hopper, so that said resin is converted to Na exchanger and the treated solution is discharged as water through the outlet 67.

The Na exchanger is transferred under pressure through an outlet 68 at the bottom of the column back into the hopper 58 of the solution-passing column for recirculation.

Since each treated solution is replaced in an accompanying solution removing layer 69, 70 or 71, it hardly causes any mixture or dilution.

The composition of each treated solution as obtained by the above method is as follows.

| Treated solution from passing solution | Treated liquid from regeneration column |
| --- | --- |
| $Na^+$ .............. 4.05 N | $MgCl_2$ ............ 22.5 g./100 ml. |
| $Mg^{++}+Ca$ ........ $\leq$0.1 mg./lit. | $CaCl_2$ ............ 4.0 g./100 ml. |
| $Cl^-$ .............. 3.95 N | $NaCl_2$ ............ $\leq$100 mg./lit. |
| $SO_4^-$ ............ 0.10 N | pH .............. 5.5 |

What I claim is:

1. In a process for carrying out continuous ion exchange by countercurrent contact of granular ion exchange resin with the liquid to be treated, wherein liquid to be treated is introduced into a vertical zone containing the granular ion exchange resin, the liquid being introduced near the bottom of said zone, said liquid passing upwards and compacting the granular ion exchange resin located above the said liquid-introducing level to form a compact, bed-like upper layer, the treated liquid being withdrawn from an outlet located above the region of ion exchange in said zone, while simultaneously a lower layer consisting of waste resin located below the liquid-introducing level is discharged under the pressure of the liquid whereby a void zone is formed between the said upper layer and the lower layer which is filled only with the said liquid to be treated, the introduction of liquid being interrupted for a relatively short period of time, while simultaneously the liquid in said void zone is discharged whereby the pressure is decreased within said void zone and the discharge of said lower layer is terminated while the said upper layer descends and resin with accompanying liquid is introduced at the upper part of the vertical zone to fill the space produced by the descent of the upper layer, the introduction of liquid being resumed after a predetermined amount of the resin and liquid has been introduced, an improvement for removing the accompanying liquid of the resin, which comprises providing an outlet for the accompanying liquid at the upper part of the vertical zone at a level above the outlet for said treated liquid, and discharging from the treated liquid outlet the same amount of treated liquid as that of the introduced liquid to be treated while simultaneously discharging from the outlet for accompanying liquid the same amount of said liquid accompanying said resin.

2. In a process as claimed in claim 1 wherein the discharged ion exchange material and accompanying liquid is charged to the top of a second zone into which a solution containing a regenerating agent is fed upwardly from the bottom to bring the same into contact with the ion exchange material to form two layers and wherein the latter solution is withdrawn from an intermediate level of the upper layer in said second zone, ion exchange being effected in the upper layer of the second zone to cause regeneration of the ion exchange material, the lower layer being constituted by ion exchange material which has descended from the upper layer as the ion exchange capacity thereof is regenerated, said solution exerting pressure on the material of the lower layer to effect continuous discharge thereof and to separate the liquid accompanying the ion exchange material from the first zone by discharging said accompanying liquid from an outlet located above said intermediate level of the upper layer, the latter discharged liquid being returned to liquid to be treated in the first zone, transferring the ion exchange material from the second zone to the top of a third zone into which a solution containing a regenerating agent is fed upwardly from the bottom thereof to bring the same into contact with the ion exchange material to cause the ion exchange material to be separated into two separate layers in which regeneration of the ion exchange material is effected in the upper layer, the lower layer being constituted by ion exchange material regenerated in the upper layer and which has descended from the upper layer, the solution exerting pressure on the lower layer of the third zone to effect continuous discharge thereof, and withdrawing solution accompanying the resin fed to the third zone from the top of the third zone to return the same to the regenerating solution for the second zone.

3. In a process as claimed in claim 1 wherein the ion exchange material discharged from the first zone is transferred to the top of a second zone into which a solution containing a regenerating agent for the ion exchange material together with said accompanying liquid separated from the first zone is fed upwardly from the bottom of said second zone and is withdrawn at an intermediate level of the second zone while liquid accompanying the discharged ion exchange material from the first zone is separately discharged from said second zone at the top thereof, and recovering the separated liquid from the second zone and feeding the same to the liquid to be treated in the first zone.

4. In a process as claimed in claim 1 wherein fresh ion exchange material is supplied to the first zone from a third zone during the discharge of ion exchange material from the first zone, transmitting the ion exchange material discharged from the first zone to the top of a second zone wherein a solution of a regenerating agent for the ion exchange material is fed upwardly to bring the same into contact with and regenerate the ion exchange material and wherein the ion exchange material is separated into two separate layers, the regeneration of the ion exchange material being effected in the upper layer, the lower layer being constituted by regenerated ion exchange material which has descended from the upper layer, said solution exerting pressure on the lower layer to effect continuous discharge thereof, withdrawing the regenerating solution at an intermediate level of the upper layer in the second zone while separating at a level above said intermediate level liquid accompanying the ion exchange material discharged from the first zone, the said accompanying liquid being returned to liquid to be treated in the first zone, transferring the ion exchange material discharged from the second zone to the top of the third zone and wherein a solution for neutralizing the regenerating agent is combined with the liquid separated from the ion exchange material in the first zone and is fed upwardly in said third zone and withdrawing at an intermediate level of the zone to cause the ion exchange material to be separated into two separate layers and wherein neutralization of the ion exchange material is effected in the upper layer, the lower layer being constituted by neutralized ion exchange material which has descended from the upper layer as neutralization is completed, said solution in the third zone exerting pressure on the lower layer therein to effect continuous discharge thereof, said solution being effective to separate at a level located above the withdrawal level of the neutralizing solution the liquid accompanying the ion exchange material discharged from the second zone, the latter said accompanying liquid being returned to the regenerating solution for the second zone.

5. A process for forming sodium sulfate and ammonium chloride from an ammonium sulfate solution according to the process of claim 3, which comprises feeding the ammonium sulfate solution into the first zone to contact the same with Na-form resin to concomitantly form $Na_2SO_4$ and $NH_4$-form resin, transferring the $NH_4$-form resin to the second zone contacting it therein with a NaCl solution to exchange Na ion for $NH_4$ ion and thus convert said $NH_4$-form resin and said NaCl to $NH_4Cl$ and Na-form resin respectively, transferring the Na-form resin to the first zone, and withdrawing the formed sodium sulfate and $NH_4Cl$ from the first and second zones respectively.

6. A process for separately recovering a sulfuric acid solution and a copper sulfate solution from a solution mixture containing sulfuric acid and copper sulfate according to the process of claim 2, which comprises feeding the solution mixture into the first zone in countercurrent contact with H-form resin in the first zone, thereby transforming the H-form resin into Cu-form resin and recovering the treated solution containing solely sulfuric acid, discharging a portion of the thusly formed sulfuric acid solution out of the system as a product solution, transferring the remaining portion of the sulfuric acid solution to the third zone for use in regenerating $NH_4$-form resin in the third zone to H-form resin, transferring the thusly transformed Cu-form resin in the first zone to the top of the second zone together with the solution mixture of sulfuric acid and copper sulfate for ion exchange in the second zone, withdrawing the solution mixture separated at the top of the second zone and returning the same to the first zone, feeding the sulfuric acid solution transferred from the first zone into the third zone to regenerate the $NH_4$-form resin in the third zone to H-form resin and to produce an ammonium sulfate solution as a treated solution, transferring said ammonium sulfate solution to the second zone to transform the Cu-form resin to $NH_4$-form resin, transferring the regenerated H-form resin from the third zone to the first zone for ion exchange therein, feeding said ammonium sulfate solution to the second zone to allow the same to contact the Cu-form resin to convert said ammonium sulfate solution and Cu-form resin respectively to copper sulfate solution and $NH_4$-form resin, discharging the thusly converted copper sulfate solution out of the system as a product, and transferring the thusly transformed $NH_4$-form resin to the top of the third zone for ion exchange therein.

References Cited
UNITED STATES PATENTS

| | | | |
|---|---|---|---|
| 3,137,651 | 6/1964 | deLara et al. | 210—24 X |
| 3,152,072 | 10/1964 | Yomiyama et al. | 210—38 X |
| 1,624,614 | 4/1927 | McGill | 210—189 |
| 1,770,580 | 7/1930 | Neumann | 210—189 |
| 2,133,513 | 10/1938 | Hirschkind | 23—100 |
| 2,533,245 | 12/1950 | Harike | 23—125 |
| 2,592,139 | 4/1952 | Hegan | 23—121 |
| 2,986,515 | 5/1961 | Wyllie | 210—33 |
| 3,055,734 | 9/1962 | Polykala | 23—89 |
| 3,086,846 | 4/1963 | Clark | 23—167 |

EARL C. THOMAS, *Primary Examiner.*

MAURICE A. BRINDISI, OSCAR R. VERTIZ,
*Examiners.*

EDWARD STERN, *Assistant Examiner.*